No. 689,087. Patented Dec. 17, 1901.
H. E. IRWIN.
CULTIVATOR.
(Application filed Jan. 9, 1901.)
(No Model.) 2 Sheets—Sheet 1.
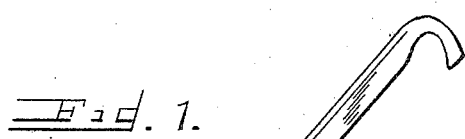
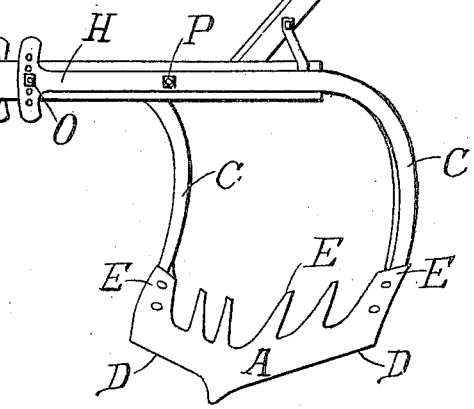
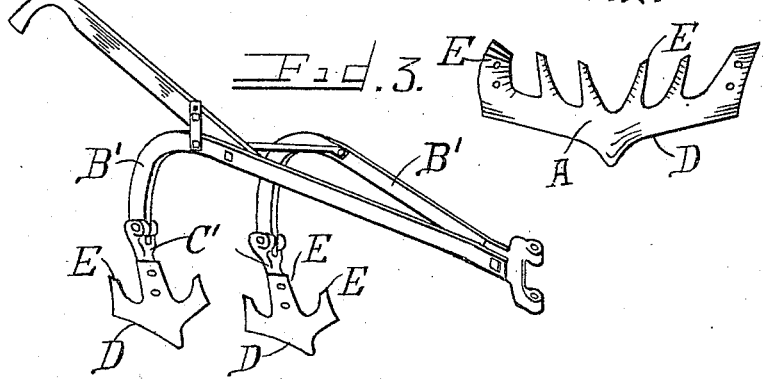

No. 689,087. Patented Dec. 17, 1901.
H. E. IRWIN.
CULTIVATOR.
(Application filed Jan. 9, 1901.)
(No Model.) 2 Sheets—Sheet 2.
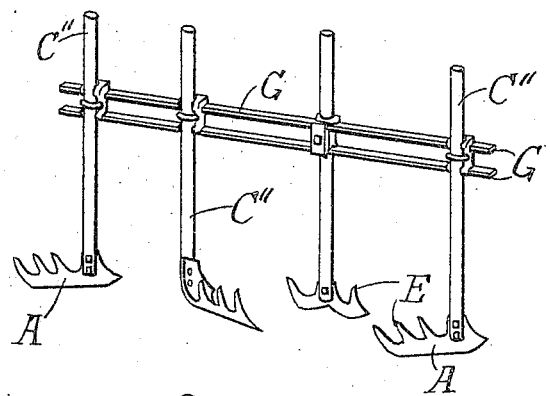
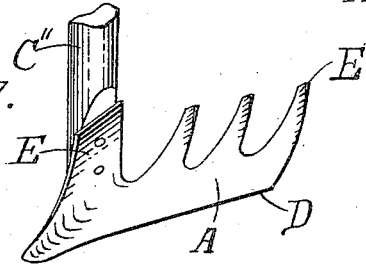
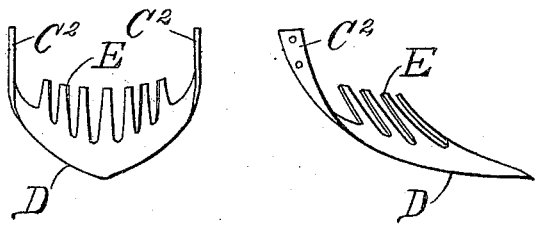
Witnesses: Inventor:
L. M. Richards. Herbert E. Irwin,
C. M. S. Richards. By L. M. Hopkins
H. M. Richards, attys.

UNITED STATES PATENT OFFICE.

HERBERT E. IRWIN, OF GALESBURG, ILLINOIS.

CULTIVATOR.

SPECIFICATION forming part of Letters Patent No. 689,087, dated December 17, 1901.

Application filed January 9, 1901. Serial No. 42,593. (No model.)

*To all whom it may concern:*

Be it known that I, HERBERT E. IRWIN, a citizen of the United States, residing at Galesburg, in the county of Knox and State of Illinois, have invented certain new and useful Improvements in Cultivators, of which the following is a specification.

The present invention relates to cultivators or other implements of a similar character adapted for use in tilling the soil.

More particularly stated, it relates to the shape or construction of the cultivator-blade and to the manner of supporting it and attaching it to the frame. Its object, broadly stated, is to improve cultivators in these respects to the end that the work of disintegrating the clods of earth and uprooting weeds and separating them from the soil will be done more thoroughly and effectually than with cultivators having blades of customary construction.

So far as the present invention is concerned the cutting edge of the blade may be of V shape, or approximately so, its middle portion being in advance of the other portions, or it may proceed in a straight or approximately straight line which is oblique to the line of draft.

The invention consists in the features of novelty that are hereinafter described.

In order that the invention may be fully understood, I will describe it with reference to the accompanying drawings, which are made a part of this specification, and in which—

Figure 1 is a perspective view of a cultivator embodying the invention in its preferred form. Fig. 2 is a front elevation of the blade thereof removed. Fig. 3 is a perspective view of a cultivator embodying some features of the invention. Figs. 4 and 5 are front elevations of the blades thereof removed. Fig. 6 is a perspective view of a portion of a cultivator embodying some features of the invention and showing blades of the forms shown in Figs. 3, 4, 5, and 7 in connection with a portion of a form of frame which is common in beet-cultivators. Fig. 7 is a perspective view of a blade embodying some features of the invention and a portion of its hanger. Figs. 8 and 9 are respectively a front elevation and a side elevation of a blade embodying some features of the invention.

So far as the present invention is concerned it is immaterial what the construction of the frame is so long as it has means for attaching thereto the blade or blades of the cultivator or the hangers to which the blade or blades are immediately joined, and in Figs. 1, 3, and 6 I have shown frames of as many different constructions.

As shown in Fig. 1, the frame consists of a beam B, side bars H, located upon opposite sides of the beam and pivotally secured thereto by means of a bolt P, and hangers C, formed in continuation of the rear ends of the side bars H, the forward ends of said bars being provided with T-heads, each having a series of perforations arranged concentrically with the bolt P and adapted to receive a bolt O, which may be passed through any one of them and through the beam for the purpose of adjusting the inclination of the hangers C, and thereby adjusting the blade, thus putting the depth of cultivation under the control of the operator. As here shown, the hangers proceed in unbroken continuity from the beam to the blade A.

In the form shown in Fig. 3 the beam is made up of two divergent bars B', the rear ends of which are deflected downward, so that they enter into the construction of the hangers, the lower portions C' of which are pivotally secured to the depending portions of the bars.

In the form shown in Fig. 6 the hangers C" take the form of straight rods, which are secured by any suitable means to the frame, a portion of which is shown at G.

In all of these several forms the frame either has a hanger which is immediately joined to the blade or else it is provided with a portion to which the hanger is or may be secured by some suitable means.

As shown in Figs. 1 and 2, the blade A has a cutting edge D, which is of V shape, or approximately so, and arranged with its angle or apex in advance, said apex being preferably extended downward below the remainder of the cutting edge in order to give the blade the necessary downdraft. Behind this cutting edge the blade is provided with a plurality of teeth E, which project upward and may or may not be warped or deflected laterally, depending upon the character of the work to be done, the teeth and blade being here shown as formed of a single piece of metal. The bases of these teeth are somewhat above the level of the cutting edge D, so that as the blade advances the earth will ride up on that portion of it which intervenes the cutting edge D and the bases of the teeth, and upon reaching the latter the clods will be disintegrated and the earth thoroughly shaken from the roots of uprooted weeds and the like. This description applies equally to the blades shown in Figs. 1 to 5, inclusive. The blade shown in Figs. 3, 4, and 5 is similar to the blade shown in Figs. 1 and 2 in all respects, excepting that the former has only three upwardly-extending teeth E, while the latter has a greater number.

The forms shown in Figs. 1 to 7, inclusive, are alike in that the hanger joins a tooth or teeth of the blade and in that the hanger is a part which is separate from the blade and united thereto by rivets or other suitable means, while in the forms shown in Figs. 8 and 9 the hangers $C^2$ are integral with the blade and join the blade proper rather than the teeth thereof.

The forms shown in Figs. 1, 2, 8, and 9 are alike in that the hangers join the blade at both of its ends, and in this respect differ from the forms shown in Figs. 3 to 7, inclusive, where the blade is supported by a single hanger, which joins the central tooth, as shown in Figs. 3, 4, and 5, or the end tooth, as shown in Fig. 7. In all of these several forms of the invention the hanger joins the blade in rear of the cutting edge, so that it does not in any respect act as a colter, and in all of the several forms the bases of the teeth join the blade proper behind the cutting edge and at a level somewhat above it, so that between the cutting edge and the bases of the teeth the blade has a somewhat-broad surface which slopes upward and rearward from the cutting edge. In these respects a blade constructed in accordance with the present invention differs from a blade having a substantially horizontal portion which is adapted to travel beneath the surface of the earth, twisted teeth behind this substantially horizontal portion, and a colter-shaped hanger joining one end of the horizontal portion of the blade and having its forward or cutting edge in line with the forward or cutting edge thereof.

Having described my invention, what I claim as new therein, and desire to secure by Letters Patent, is—

1. A cultivator having a blade provided with a cutting edge and having a plurality of teeth located behind the cutting edge and extending upward, and rearward, said teeth having broad faces presented forward and sloping sidewise, and means for suspending the blade through a tooth thereof, substantially as set forth.

2. A cultivator having a blade provided with a cutting edge and having a plurality of teeth located behind the cutting edge and extending upward, and rearward, said teeth having broad faces presented forward and sloping sidewise, and means for supporting the blade through an end tooth thereof, substantially as set forth.

3. A cultivator having a blade provided with a cutting edge and having a plurality of teeth located behind the cutting edge and extending upward, and rearward, said teeth having broad faces presented forward and sloping sidewise, and suspending means joining the ends of the blade in rear of the cutting edge but forming no perceptible angle therewith, substantially as set forth.

4. A cultivator having a blade provided with a cutting edge and having behind the cutting edge a plurality of teeth extending upward and rearward, said teeth having broad faces presented forward and sloping sidewise, and a hanger joining a tooth of the blade, substantially as set forth.

5. A cultivator having a blade provided with a cutting edge and having behind the cutting edge a plurality of teeth extending upward and rearward, said teeth having broad faces presented forward and sloping sidewise, and suspending means joining the end of the blade behind the cutting edge thereof, substantially as set forth.

6. A cultivator having a blade provided with a cutting edge and having behind the cutting edge a plurality of teeth extending upward and rearward, said teeth having broad faces presented forward and sloping sidewise, and means for suspending the blade at both of its ends, said suspending means being located wholly behind the cutting edge of the blade, substantially as set forth.

7. A cultivator having a blade provided with a cutting edge and having behind the cutting edge a plurality of teeth extending upward and rearward, said teeth having broad faces presented forward and sloping sidewise, and a hanger joining a tooth at the end of the blade, substantially as set forth.

8. A cultivator having a blade provided with a cutting edge and having behind the cutting edge a plurality of teeth extending upward and rearward, said teeth having broad faces presented forward and sloping sidewise, and a pair of hangers joining the end teeth of the blade, substantially as set forth.

9. A cultivator having a blade provided with a V-shaped cutting edge and having behind the cutting edge a plurality of teeth extending upward and rearward, said teeth having broad faces presented forward and sloping sidewise, and a hanger supporting the blade, the apex of the blade being deflected downward, substantially as set forth.

10. A cultivator having a blade provided with a V-shaped cutting edge and having behind the cutting edge a plurality of teeth extending upward and rearward, said teeth having broad faces presented forward and sloping sidewise, and a pair of hangers joining the ends of the blade behind the cutting edge thereof, substantially as set forth.

11. A cultivator having a blade provided with a V-shaped cutting edge and having behind the cutting edge a plurality of teeth extending upward and rearward, said teeth having broad faces presented forward and sloping sidewise, and a pair of hangers joining the end teeth of the blade, substantially as set forth.

12. A cultivator having a blade provided with a V-shaped cutting edge and having a plurality of teeth extending upward and rearward, said teeth having broad faces presented forward and sloping sidewise, arranged with their bases behind and somewhat above the cutting edge, and a pair of hangers joining the ends of the blade, wholly in rear of the cutting edge thereof, substantially as set forth.

HERBERT E. IRWIN.

Witnesses:
JOHN PAUL IRWIN,
ELIAS T. BYRAM.